No. 667,652. Patented Feb. 5, 1901.
A. DE VILBISS, Jr.
SCALE.
(Application filed July 18, 1900.)
(No Model.)
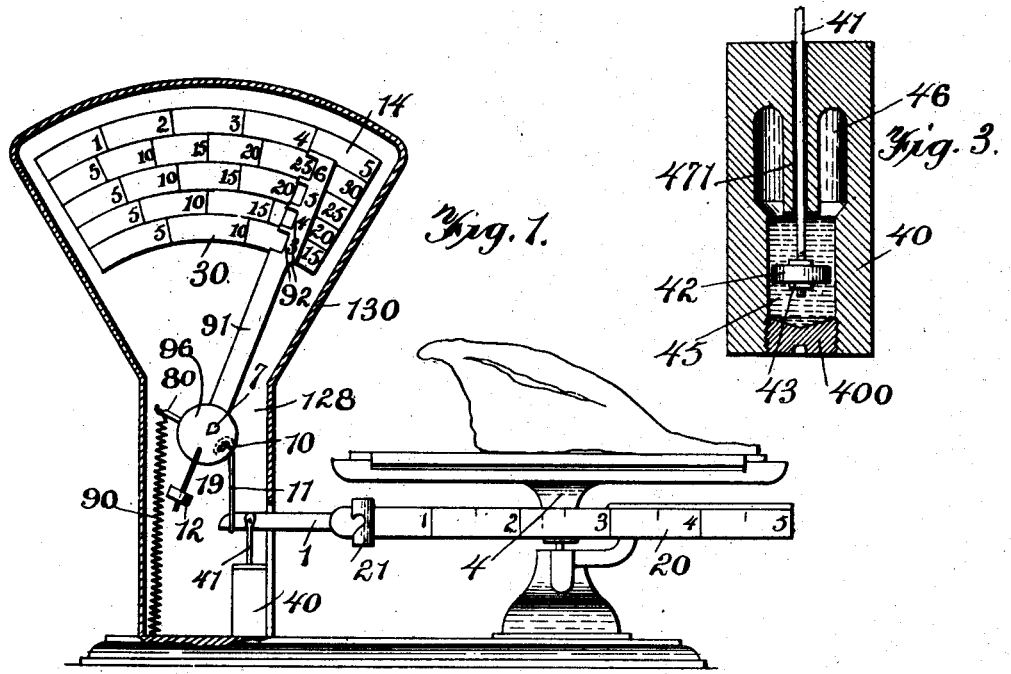
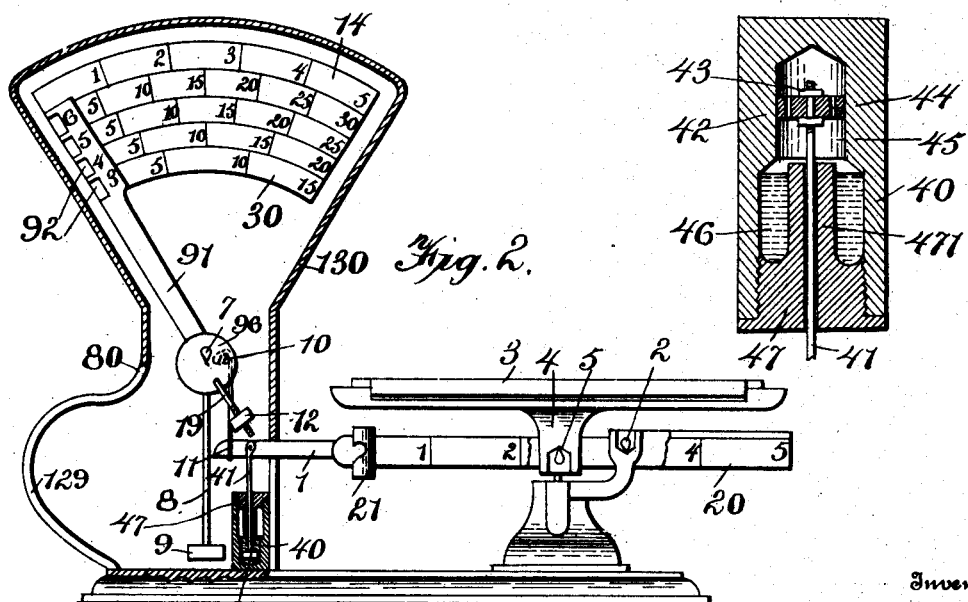
Witnesses:
Geo. E. Frech.
Enoch Edmonston Jr.
Inventor:
Allen De Vilbiss, Jr.
by Collamer & Co.,
Attorneys.

UNITED STATES PATENT OFFICE.

ALLEN DE VILBISS, JR., OF TOLEDO, OHIO, ASSIGNOR TO THE DE VILBISS COMPUTING SCALE COMPANY, OF SAME PLACE.

SCALE.

SPECIFICATION forming part of Letters Patent No. 667,652, dated February 5, 1901.

Application filed July 18, 1900. Serial No. 24,065. (No model.)

*To all whom it may concern:*

Be it known that I, ALLEN DE VILBISS, Jr., a citizen of the United States, and a resident of Toledo, Lucas county, State of Ohio, have invented certain new and useful Improvements in Scales, (Case S;) and my preferred manner of carrying out the invention is set forth in the following full, clear, and exact description, terminating with claims particularly specifying the novelty.

This invention relates to weighing-scales, preferably of that class which compute or indicate the total weight or total price by a hand standing normally at zero, but moved over a table by the load and coming to rest when the same is offset by a pendulum, by a spring, or by any other automatic means; and the object of the same is to provide a device for overcoming the well-known vibration of the hand after the load is applied and before the hand comes to rest.

To this end the invention consists in a dash-pot adapted to contain a liquid, preferably oil, within which moves a piston whose rod is connected to some part of the weighing mechanism, that portion of the dash-pot above the part in which a piston moves having a chamber of greater diameter and provided with a depending lip surrounding the opening for the piston-rod.

The following specification describes briefly the general construction and operation and at greater length the improvements and their advantages, all as illustrated in the accompanying drawings, wherein—

Figure 1 is a sectional view through one type of my scale embodying the use of a spring to offset the weight of the load and the hand as moved by a load to four pounds. Fig. 2 is a similar section with the hand at zero, excepting that herein a pendulum and weight are used instead of a spring. Figs. 3 and 4 are enlarged sectional views of the dashpot, the former of slightly-modified construction, the latter with the entire dash-pot inverted, and the two views illustrating different constructions of pistons.

1 is the main scale-beam, fulcrumed at 2 on a support which rises from the base or frame, and 3 is a pan or platform having a standard 4, pivotally supported, as at 5, upon said beam. The base supports a casing consisting of an upright body portion 128, having a lateral extension 129 and a housing 130, open at its front to expose a table 30, which is marked on its face with several rows of price-totals and near its upper edge with a single row of weight-totals 14.

Mounted on knife-edge bearings 7 within the body portion of the casing is a disk 96, from which hangs rigidly a pendulum 8, having a fixed weight 9 at its lower end. Fixed to and rising from the disk oblique to the pendulum is a hand or index 91, preferably having notches 92 in its active face, adjacent which are numerals to coact with the several lines of price-totals. Projecting from the disk diametrically opposite the center of gravity of the hand is a screw 19, on which is an adjustable nut 12, forming a counterbalance for the weight which the hand possesses when it stands oblique. In the disk at a point between the screw and hand is a knife-edge pivot 10, whose edge is above that of the central pivot 7 when the pendulum is vertical and over which hangs a link 11, that extends downward and is connected with the scale-beam.

The construction shown in Fig. 1 differs from that above described only in that a spring 90 is substituted for the weighted pendulum, which spring is connected at one end with the base of the casing and at the other end with a rod 80, projecting from the disk at a proper point and angle, so that the tension of the spring shall hold the hand normally at zero. When the spring is used, it is obviously not necessary to have the lateral extension 129 on the casing. Although not shown in the drawings, the front of the casing is removable, or that side thereof near the operator may be left open, so that access to the interior is permitted. I show and describe herein a weighted pendulum and a spring; but I desire to be understood as intending to include any means for automatically counterbalancing or offsetting the weight of the load.

20 is a tare-beam moving in unison with the main beam and preferably extending past both pivots 2 and 5. The tare-beam may have figures marked thereon, as shown, and 21 is the tare weight.

40 is a cylinder mounted by preference within the body portion of the casing about where shown, and 41 is a rod pivoted to the scale-beam and supporting a piston 42, which may be adjustable, as by nuts 43, above and below. Interiorly the cylinder is bored out at its lower end to form a dash-pot 45 of relatively smaller diameter and at its upper end to form a chamber 46 of relatively larger diameter.

47 is a cover closing the upper end of the cylinder, and hence of the chamber, and 471 is a lip depending rigidly from this cover into the chamber and nearly to the bottom thereof, which is the top of the dash-pot. The cover and lip are pierced with an opening through which loosely passes the rod 41, and the piston 42 is either somewhat smaller in diameter than the dash-pot, as seen in Fig. 3, or it may have openings 44 through its body, as seen in Fig. 4. Either or any equivalent construction permits passage through or by the piston of oil or other liquid with which the dash-pot is evenly filled. When a scale containing this form of dash-pot is inverted, the liquid runs out of the dash-pot into the chamber, whose diameter is greater than that of the dash-pot. Hence the liquid then stands as seen in Fig. 4, and the necessity for packing around the rod is obviated.

The weight 12 counterbalances the hand 91. The pendulum with its weight or weights hangs normally vertical and swings outward into the extension 129 as the disk 96 turns on its pivot 7, or if the spring be used the turning of the disk moves the rod 80 upward and distends the spring, and the other parts are so arranged and proportioned that when the tare weight is at zero they are exactly counterbalanced over the fulcrum 2. When a load is placed on the platform, the inner end of the beam 1 descends, the link 11 turns the disk, and the hand 91 moves over the table, while the pendulum rises and gains weight sufficient to balance the load, or the spring is distended sufficiently to accomplish the same end. Meanwhile the piston descends in the liquid, and the density of the latter causes the hand to come quickly to rest. Had the load been lard, for instance, the grocer would have first placed a crock on the platform and immediately moved the tare weight 21 until the hand returned to zero from the point to which the weight of the crock had moved it. Thereafter the weighing of the commodity proceeds as above described.

The row 14 gives the total of weight, the figures on the hand are the price per pound, and the figure in the table 30 which is exposed through the notch 92 opposite the price per pound is the total price. It is obvious that the device as herein described could be used in connection with an automatic scale which did not compute. This could be done by omitting all rows on the table excepting the weight-row 14, and that could clearly contain a scale to represent pounds and fractions thereof.

In Fig. 3 is shown a slight modification over the construction elsewhere illustrated. Here the upper end or cover 47 of the cylinder is an integral part thereof, and access to the interior is gained through a plug 400, screwed or otherwise inserted into the lower end of the cylinder. I consider either construction useful, and they will produce identically the same result in the operation of the whole. However, I do not wish to be limited to gaining access to the interior of the cylinder through either end, as it might be accomplished by making any part thereof removable.

What is claimed as new is—

1. In a weighing-scale, the combination of the supporting-frame, a dash-pot secured thereto and adapted to contain a liquid; of a piston-rod and piston carried by a moving part of the weighing mechanism, and arranged to move in the dash-pot, the dash-pot having above the parts thereof in which the piston moves a chamber of greater diameter, provided with an internal depending lip surrounding the opening for the piston-rod.

2. In a weighing-scale, the combination with the supporting-frame, the weighing mechanism, a piston, and a rod connecting it with said mechanism; of a cylinder mounted on the frame and having at its lower portion a dash-pot in which the piston moves and at its upper portion a chamber of greater diameter than the dash-pot, a lip depending from the upper end of the cylinder and surrounding the piston-rod, and a plug closing the bottom of the dash-pot.

3. In a weighing-scale, the combination with the supporting-frame, the weighing mechanism, a piston, and a rod connecting it with said mechanism; of a cylinder mounted on the frame and having at its lower portion a dash-pot in which the piston moves and at its upper portion a chamber of greater diameter than the dash-pot, and a plug closing the bottom of the dash-pot.

4. In a weighing-scale, the combination with the supporting-frame, the weighing mechanism, a piston, and a rod connecting it with the said mechanism; of a cylinder mounted on the frame and having at its lower portion a dash-pot in which the piston moves and at its upper portion a chamber of greater diameter than the dash-pot, and a lip depending from the upper end of the cylinder and surrounding the piston-rod, part of said cylinder being removable so as to provide access to its interior.

In testimony whereof I have hereunto subscribed my signature this 17th day of July, A. D. 1900.

ALLEN DE VILBISS, Jr.

Witnesses:
N. L. COLLAMER,
G. W. BALLOCH.